United States Patent [19]

Takata

[11] Patent Number: 4,964,575
[45] Date of Patent: Oct. 23, 1990

[54] BOOM FLOW CONTROL MECHANISM FOR PNEUMATIC SPREADERS

[75] Inventor: Harry H. Takata, Edina, Minn.

[73] Assignee: Ag-Chem Equipment Co., Inc., Minneapolis, Minn.

[21] Appl. No.: 358,666

[22] Filed: May 30, 1989

[51] Int. Cl.$^5$ .............................. A01C 3/06; B05B 1/30
[52] U.S. Cl. ..................................... 239/655; 239/689; 406/131; 406/192
[58] Field of Search ....................... 239/654, 655, 689; 406/131, 192; 222/630

[56] References Cited

U.S. PATENT DOCUMENTS

| Re. 24,256 | 12/1956 | Smith | 239/655 |
|---|---|---|---|
| 3,260,285 | 7/1966 | Vogt | 406/192 X |
| 3,926,377 | 12/1975 | Johnson | 239/655 |
| 4,475,819 | 10/1984 | Balmer | 239/654 X |
| 4,529,104 | 7/1985 | Tyler | 222/630 X |
| 4,709,860 | 12/1987 | Patrick et al. | 239/654 |
| 4,767,062 | 8/1988 | Fletcher | 239/655 |
| 4,872,785 | 10/1989 | Schrage et al. | 406/192 X |

FOREIGN PATENT DOCUMENTS

807982  1/1959  United Kingdom ............... 239/655

Primary Examiner—Andres Kashnikow
Assistant Examiner—William Grant
Attorney, Agent, or Firm—Haugen and Nikolai

[57] ABSTRACT

An improved system for pneumatic spreader systems for selective distribution of particulate material onto agricultural fields from selected ones of a plurality of elongated delivery tubes or booms. The improved feature of the present invention comprises a means to interrupt flow of particulate material from certain preselected booms without clogging the system. The system includes a means for substantially completely blocking the flow cross-sectional area from a preselected one or plurality of delivery tubes, along with a line which normally functions as a feed line when the system is in normal operation, but as a recycling line when the delivery tube is in blocked or shut-off disposition. The arrangement provides a means for converting a twin-boom arrangement to a single-boom arrangement for accommodating unusual operation such as less-than-a-full boom width when undertaking the final run of a field application.

13 Claims, 5 Drawing Sheets

BOOM FLOW CONTROL MECHANISM FOR PNEUMATIC SPREADERS

CROSS-REFERENCE TO RELATED APPLICATIONS

The present invention finds particular utility for use in combination with that certain Venturi System for Agricultural Spreaders of Solid Particles disclosed in co-pending application Ser. No. 07/315,277, filed Feb. 24, 1989, and assigned to the same assignee as the present invention.

BACKGROUND OF THE INVENTION

The present invention relates generally to an improved pneumatic spreader system for distribution of agricultural crop treating chemicals in granular, particulate or pulverulent solid form upon the soil, and more particularly to a system for achieving such distribution through the use of a plurality of elongated delivery tubes or booms with discharge orifices arranged adjacent the outer tips thereof, and wherein shut-off means are provided for individual booms so as to interrupt flow of particulate or granular material from certain specific selected booms, while the other booms are permitted to remain active and in normal operation. The apparatus of the present invention is effective against granular material build-up or clogging, and is adapted to produce a more uniform distribution of solids at a constant application rate through those booms remaining active.

Pressurized pneumatic systems utilizing a single distribution head delivering or metering a supply of granular or particulate material for controlled discharge of such material from a plurality of elongated booms have been employed in the past, however the systems currently in use normally deliver granular products through all of the booms at all of the time. Reliable and non-clogging means capable of providing uniform distribution and application rates have not been available for those systems providing for periodic and controlled interruption of delivery of granular products or materials from certain selected booms. The present invention provides a reliable and non-clogging system for such controlled distribution, while at the same time maintaining the distribution and application rate at a substantially uniform and constant level through the active booms.

Agricultural techniques require the utilization of soil treating agents to either encourage, discourage, destroy, or inhibit plant growth. Such agents may generally be characterized as crop treating chemicals, and include materials designated as nutrients such as fertilizers, and pesticides such as insecticides and herbicides including pre-emergent and/or post-emergent plant growth inhibitors. Accordingly, the term "crop treating chemical" is used in a comprehensive sense to incorporate those various ingredients utilized in agriculture to treat either the soil, the growing crop or plants, or certain insects which may damage the crop. Active materials used for treatment are commonly found in one of three forms, either water soluble, water wettable, particulate solid or in surface-impregnated solid form. In connection with the present invention, granular materials and/or surface-impregnated (wetted) granular materials are of particular interest, with the system of the present invention being particularly adapted for use in connection with the selective and uniform distribution of such materials through the system and onto the soil or other surfaces being treated.

In the treatment of agricultural fields and crops through spreading of one or more active treating ingredients, the efficiency of the treatment operation may be enhanced if the distribution of the ingredients is maintained at a uniform and/or controllable rate. Uniform application rates have become an important factor, particularly with the use of certain pesticides and/or herbicides which require a predetermined application rate in order to be effective, and yet not harmful to the crop being treated. Additionally, the efficiency of the operation may be enhanced if the actual load required to be carried by the spreading equipment is reduced. Therefore, the utilization of dry particulate solids will substantially reduce the load requirement, inasmuch as water or other treatment medium or treatment vehicle is not required. The need for multiple passes may be reduced if surface-impregnated granular material may be uniformly spread, such as through the use of a granular fertilizer having a surface impregnated with a particular pesticide. The utilization of pressurized pneumatic systems will normally eliminate or substantially reduce the vehicle load by eliminating the need for large quantities of water, since pneumatic systems normally utilize a compressor to generate a supply of compressed air in lieu of a liquid plus liquid pressure source as a means to create a medium for accomplishing delivery of the treating ingredient onto the soil.

Pneumatic spreader systems typically are mounted upon self-propelled vehicles, thereby providing a means for achieving the distribution. In order to render these systems efficient, elongated booms are employed, and it is not uncommon for such booms to extend outwardly a distance of 18 feet or more from the center axis of the vehicle. Frequently, when the operator is close to the edge of a field, the entire width-spreading capability of the system is not needed, and in fact any double-coverage may be both wasteful and possibly damaging to the crop being treated. Accordingly, and in order to achieve both a wide expanse spreading capability, as well as the capability of selectively reducing the width, the system of the present invention permits periodic interruption of flow or delivery of particulate material from certain selected booms. In order to render the system more highly advantageous, this interruption of flow is achieved while maintaining uniform application rates and without increasing the tendency of the system to become clogged. An added advantage of the system permits intermittent shut-down of certain booms when the fertility index varies across the field being treated. In such instances, it may become desirable to eliminate application of certain materials in certain pre-defined areas across a given field, thus providing greater versatility for the apparatus of the present invention.

In order to maintain normal flow of particulate solids through a pressurized pneumatic system, uniform, consistent and uninterrupted flow patterns are desirable. However, such application rate consistency becomes difficult, if not impossible to achieve, when attempts are made to periodically block-off the flow of particulate solids to selected booms. Such attempts frequently create a non-uniformity in application rates and normally lead to a tendency of the particulate solids or granular materials, particularly surface treated granular materials, to clog portions of the distribution system, and thereby establish a need for temporary shut-down of the equipment until the boom may be cleared and thus relieve the clogging.

As indicated, uniformity of distribution of particulate materials depends to a certain extent upon predetermined patterns of air movement through the entire system, including the distribution head, the material transferring conduits, as well as the individual booms. Attempts to simply block-off the flow of air through one or more booms may interfere with normal and anticipated patterns through the system. Furthermore, attempts to modify the position of individual material transferring conduits throughout the system contributes to interference with normal patterns of flow through the system, and thus leads to lack of uniformity of distribution of particulate materials. As indicated, pressurized pneumatic systems normally employ a plurality of elongated hollow delivery booms, with these booms extending outwardly of the vehicle to certain predetermined and differing lengths. In order to preserve operational integrity and predictability, therefore, uniformity of patterns of air movement, including uniformity of flow volumes through individual booms comprising the entire system is a desirable objective and goal. The features of the present invention permit selective shut-off of flow of granular material through certain preselected booms, it having been found that the system accomplishes this goal without increasing the tendency to clog, and thus preserving uniformity of continued distribution of particulate solids from the remaining operative booms in the system. The features of the present invention have been found desirable for improving the performance of systems utilizing elongated hollow discharge or delivery booms through selective shut-off of certain predetermined booms, whenever it is desired that the system operate with certain selected booms being non-functional.

SUMMARY OF THE INVENTION

Briefly, and in accordance with the present invention, an improved solid granular chemical applicator system is provided which improves the performance of pressurized pneumatic spreader systems utilizing elongated booms by providing a means for selectively interrupting flow of material to certain booms while maintaining uniform flow of materials through the remaining booms, and at the same time, providing for substantially uniform distribution of particulate solids upon the surface of the soil being treated. A particular advantageous feature of the present invention is its ability to effectively handle and utilize impregnated or surface treated granular materials such as pesticide/herbicide impregnated fertilizers while maintaining desired and uniform application patterns without creating unusual material build-up or clogging of individual booms. The improved system is normally and preferably mounted upon a vehicle chassis such as the chassis of a self-propelled vehicle including either a tractor or a trailer. The system includes a reservoir with a source of supply of agricultural crop treating chemicals in granular or particulate solid form to be distributed, such as, for example, a nutrient such as a fertilizer and/or a pesticide such as an insecticide or herbicide, along with a spreader and distribution mechanism. As indicated, the granular materials may have their surfaces impregnated with a coating of a pesticide/herbicide.

The applicator systems of the present invention are typically provided with a number of conventional components, including the following:

(a) a reservoir or hopper for retaining a supply of particulate solids;

(b) a means of conveying the granular particulate solids to a distribution head where the supply is metered by being divided into a number of aliquot portions, with this conveying means being driven with a variable speed motor so as to control the quantity of granular particulate material delivered to the distribution head;

(c) a means for delivering the metered aliquot portions to the elongated booms; and (d) a means, such as a blower or compressor for delivering a supply of compressed air, to move the material along with a flow of air outwardly through the booms and ultimately to a point of discharge. These systems may optionally be provided with the following:

(e) a means for impregnating the individual granular particles with an additional crop or soil-treating ingredient, such as an aqueous coating of a pesticide material.

Turning to these components briefly, and individually, a distribution head controllably vented to atmosphere is provided, as indicated, for receiving a supply of particulate solids, and for metering and apportioning these solids into a plurality of generally aliquot portions. As will be shown in greater detail hereinafter, controlled venting of the distribution head is desired, so as to accommodate an in-flow of air when all booms are operating normally, while reducing and/or eliminating the introduction of such air when some of the individual booms are in shut-off mode. While conventional distribution heads of this general type are known in the art, modifications and added features of the type shown hereinafter permit individual boom shut-off while preserving uniformity of distribution from those booms remaining active. In the present system, a plurality of elongated hollow discharge or delivery booms are employed, with the proximal end of each boom being coupled to and receiving a source of pressurized or compressed air such as at a plenum chamber, with means being provided to shut off one or more of the individual booms, as are indicated by the immediate requirements of the system.

OPERATION WITH ALL BOOMS FUNCTIONING NORMALLY

A discharge or delivery port is formed in the boom at or adjacent the distal end thereof, with the granular crop treating material or chemical being discharged from that point. A tubular conduit or feed supply tube is coupled to the normal output of the distribution head, and is adapted to normally convey one aliquot portion of granular material from the distribution head to a junction point with a discharge or delivery boom. The junction point is located adjacent the inner or proximal end of the boom at a point closely spaced from and immediately downstream of the proximal end thereof. In normal operation, the flow of air through the booms serves a dual purpose, one purpose being to carry or support the flow of granular material to the discharge point of the boom, the other being to create a partial vacuum in the tubular conduit or feed supply tube for introduction of granular solids into the air stream. Therefore, each conduit or tubular feed member delivers one aliquot portion from the distribution head into the boom, with the compressed air normally carrying or moving the particulate solids outwardly to the delivery point located at the boom tip. This normal operation is modified significantly when individual booms are arranged in shut-off mode, as will be pointed out in detail hereinafter. Continuing with the normal operation of the system, in order to provide for the introduction and transfer of particulate solid or granular material into the boom, particularly at the point of introduction, a zone of reduced pressure is created, such as through the Venturi means in accordance with the system disclosed in co-pending application Ser. No. 07/315,277, filed Feb. 24, 1989, and referred to hereinabove. The arrangement of the present invention has been found to function well in combination with the system disclosed in co-pending application Ser. No. 07/315,277, however the system of the present invention is compatible with and may be utilized with other systems as well.

OPERATION WITH ONE OR MORE BOOMS IN SHUT-OFF MODE

The boom selection means of the present invention includes a flow restriction device which may be introduced into each of the booms selected for operation in the non-discharge or shut-off mode, with this flow interrupter device preferably being in the form of a damper, valve, or gate which may be introduced across at least a substantial portion of the inner cross-sectional area of the boom. In one operational embodiment, the damper means includes a plate or the like which is actuated by means of an electrically or hydraulically actuated cylinder, with articulating push rods or the like being coupled between the cylinder ram and the damper means. The damper preferably blocks a zone representing between about 70 percent and 100 percent of the overall cross-sectional area of the boom, it being noted that broader percentage ranges may be found useful as well. Generally speaking, and for most applications however, flow of particulate material will be substantially completely interrupted when approximately 75 percent of the inner cross-sectional area of the boom is blocked. When some residual flow of air is permitted to continue through the system, the air passing through the balance of approximately 25 percent of the boom cross-sectional area allows adequate residual flow to avoid excessive build-up of pressure in the system, as well as to assist in freedom from clogging, by reducing the tendency of trapped granular material to accumulate within the boom.

With the flow of air along one or more of the elongated booms being either shut-off or substantially reduced (with the exception of the residual flow), the pressurized air entering the system from the plenum is discharged through the tubular conduit or feed supply tube coupled to the output of the distribution head, and thus is free to move through those individual booms remaining open and/or operational. In other words, during normal operation, the tubular conduit or feed supply tube functions as a means for conveying granular material from the distribution head to the boom, while during periods of boom shut-off, this conduit or tube functions as a means to recirculate air from the shut-off boom back to the distribution head. In order to accommodate this flow of additional air entering the distribution head from the feed supply tubes, means are provided for closing the vent which normally couples the distribution head to ambient, with this closure providing for passage of this pressurized air into the distribution head, and thence outwardly of the system through those certain booms remaining open. Closing of the vent also eliminates the possibility of granular material being blown outwardly of the vent during periods of partial boom shut-off. In other words, that portion of the pressurized air entering the distribution head through the feed supply tube is utilized to maintain the flow of granular or particulate material from the distribution head to those discharge booms which remain operative during times of partial shut-off without risking inadvertent blow-off of granular material from the vent whenever an over-pressure condition would arise in the head.

Whenever one or more booms are placed in shut-off mode, the flow of granular material from the supply hopper to the distribution head is reduced in proportion to the number of booms shut-off so as to preserve a uniform rate of application through the remaining booms. Specifically, a means is provided which interconnects the boom shut-off control and the variable speed motor driving the conveyor feeding the auger. This arrangement will be discussed in greater detail hereinafter.

As indicated hereinabove, the system of the present invention has been found to function well in combination with that certain system disclosed in application Ser. No. 07/315,277, filed Feb. 24, 1989, and referred to hereinabove, with the apparatus of the present invention being disclosed while mounted within, and functioning with such a system. As indicated, that system includes a Venturi means which comprises a flow wedge with an inlet ramp portion, an outlet ramp portion, and a throat portion intermediate the inlet and outlet ramp. In addition, a flow control blade means is provided in generally opposed relationship to the throat portion of the Venturi, with the blade means having an outer tip which, itself, extends generally along a chordal line across the boom and in generally parallel relationship to the chordal line defined by the Venturi throat. The blade means further extends radially inwardly of the boom and at an angle which converges toward the distal end of the boom. The opening which is defined between the inner tip of the flow control blade and the surface of the Venturi ramp is substantially rectangular. This rectangular configuration for the open area or zone provides a means for equalizing the flow of air across the entire opening within the boom, with this feature having been found to considerably reduce any tendency of the granular material, particularly wetted granular material, to build up in the area of the Venturi and thus contribute to clogging. This reduction in tendency toward clogging has been found to be useful in connection with the selective boom shut-off system of the present invention, and further contributes to a continuous recirculation of air from the individual booms back to and through the distribution head for ultimate passage through booms functioning normally.

In order to maintain desired and predetermined and uniform application rates, means are preferably provided to reduce the flow of incoming material to the distribution head in an amount proportional to the reduction in output quantity. In other words, since the overall output volume of the system is at least temporarily reduced, the rate of delivery of incoming material to the distribution head is correspondingly reduced so as to compensate for the reduced output of the system. Such an operational feature is conveniently accomplished by means of correlating the shut-off of one or more booms with a proportional reduction in drive rate of the conveyor transferring material from the hopper to the feed auger.

It has been found that the shut-off means of the present invention provides for even and positive flow for granular and/or particulate materials present in the system, including the flow or movement of these solids through those certain booms which remain operative. By maintaining the rate of input of granular material to the system proportional to the system output, uniform application rates are achieved. Furthermore, this uniform flow of granular or particulate material is maintained without creating additional tendencies toward unusual distribution patterns within the system, or toward clogging of granular materials within the elongated boom structures.

Therefore, it is a primary object of the present invention to provide an improved system for delivery of granular material or particulate solids from a pressurized pneumatic system, wherein an improved boom shut-off means is provided in order to achieve temporary interruption of delivery of particulate solids to preselected booms, while maintaining uniform delivery of granular or particulate solids into the flow of pressurized air moving through each of the elongated delivery booms which remain active.

It is a further object of the present invention to provide an improved selective delivery system for use in combination with pressurized pneumatic systems for distribution of granular or particulate solids therefrom, including surface-wetted granular solids, and wherein the system includes means mounted within preselected elongated delivery booms designed to controllably interrupt the flow of air and accordingly check introduction of particulate solids to the preselected booms.

It is yet a further object of the present invention to provide an improved pressurized pneumatic system for the distribution of particulate solids upon an agricultural field, and wherein the system is provided with an improved means for interrupting the flow of granular or particulate solids through certain preselected tubes, while maintaining an even and uniform flow of granular solids through the tubes remaining active, and wherein means are further provided to avoid clogging of the granular solids in and along those hollow delivery booms which are in shut-off mode.

Other and further objects of the present invention will become apparent to those skilled in the art upon a study of the following specification, appended claims, and accompanying drawings.

DESCRIPTION OF THE PREFERRED EMBODIMENT

Figure 1A:
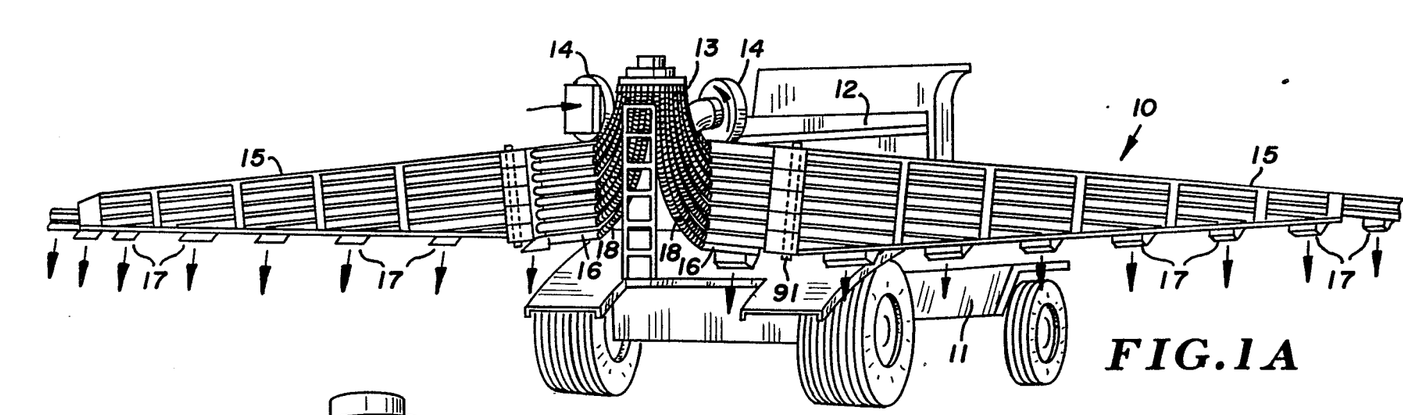
FIG. 1A is a perspective view of the side and rear portions of a typical vehicle chassis supporting a vehicular-mounted system incorporating a distribution head, a compressor, and a plurality of elongated hollow delivery booms, and wherein the booms are provided with the improved shut-off control means of the present invention.
Figure 1B:
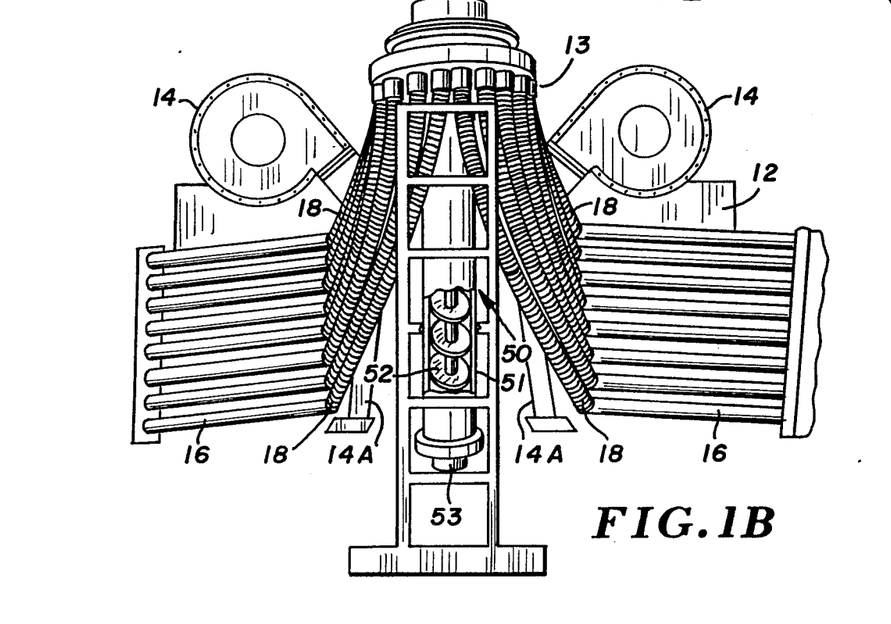
FIG. 1B is a fragmentary perspective view of the central or manifolding portion of the system illustrated in FIG. 1A.

In accordance with the preferred modification of the present invention, and with particular attention being directed to FIGS. 1A and 1B of the drawings, the pressurized pneumatic distribution system generally designated 10 is mounted upon vehicle chassis 11, and includes a reservoir 12 for retaining a source of supply of granular or particulate solids to be distributed through the system. A distribution head 13 is provided for apportioning or dividing the particulate solids received or delivered from reservoir or hopper 12 into a plurality of generally aliquot portions, with this distribution head having a controllable vent to atmosphere in the upper plate thereof (more fully described hereinafter), for controlling the amount of air introduced into the system. The opening and/or closing of the vent to atmosphere is coordinated with the closure of one or more of the booms to shut-off mode, and is provided with means for controllably opening and/or closing the communication with atmosphere in order to accommodate the recirculation flow of air introduced into the distribution head during periods of partial boom shut-off. Also, impregnation valve means may be provided to controllably impregnate the surface of fertilizer with a pesticide/herbicide, this typically occurring as the granular material moves into the vertical auger of the distribution system. Suitable impregnation devices for accomplishing the wetting operation are commercially available. Also, fertilizers which are pre-impregnated with specific types of pesticides and/or herbicides are commercially available.

A plurality of elongated hollow delivery booms 15—15 are provided to receive, transfer or move laterally outwardly, and ultimately spread the solids on the ground, with the booms being of predetermined and differing lengths, and extending laterally outwardly of the vehicle from proximal ends 16—16 to distal discharge ends 17—17. A source of compressed air such as fan blower 14 for the pressurized pneumatic system is utilized to create a flow of pressurized air into a plenum or manifold 14A and from the plenum into the proximal ends 16—16 of each boom, and ultimately through each of the hollow elongated booms 15 to outlet or discharge. Such blowers or other sources of compressed air, and their arrangement in this type of system are, of course, well known to those in the art, and need not be described in detail here. As is apparent in FIG. 1A, a cooler device may be employed in combination with one of the blowers in order to cool hydraulic fluid being used to drive components within the system. Such a device is illustrated in FIG. 1A, with this cooler being removed in the view of FIG. 1B. A plurality of tubular feed members 18—18 are also provided, with each of such tubular feed members extending between and coupling a selected output of the distribution head 13 to a selected one of said delivery booms 15—15. Also, as is conventional, the tubular feed members 18—18 provide for delivery of each of the aliquot portions into the elongated boom 15 at a point adjacent the proximal end 16, and for ultimate delivery to the distal discharge end 17 of the boom. Also, as indicated, such spreader structures are known in the art and need not be discussed and described in detail here. One such spreader structure is illustrated in U.S. Pat. No. 3,568,937 to Grataloup, with another such system being disclosed in U.S. Pat. No. 2,206,876 to Chater.

As will become apparent hereinafter, each of the tubular feed members 18—18 is coupled to a selected one of the hollow delivery booms 15—15 at a juncture point adjacent the proximal end of one of the booms, and thus achieves its purpose of continuously and uniformly introducing one aliquot portion of the particulate solids to the flow of pressurized air moving through each of the delivery booms, while functioning as a return conduit for the flow of compressed air during that time when the shut-off means has been activated. During normal operation, and while the boom is delivering particulate solids through its delivery port, introduction of those particulate solids into the delivery booms is undertaken on a basis such that the actual introduction of the solids into the flow of pressurized air is enhanced, thereby reducing if not totally eliminating tendencies of the solid particles to build up in selected locations, and thereby leading to clogging of the boom. When the boom is in shut-off mode, the tubular members 18—18 function to carry or recirculate the flow of compressed air from the plenum back to the distribution head. This added flow of air is thereafter passed through the distribution head to flow through those tubular feed members 18—18 which remain open and active and which are carrying a flow of particulate solids outwardly through their associated delivery booms.

Figure 2:
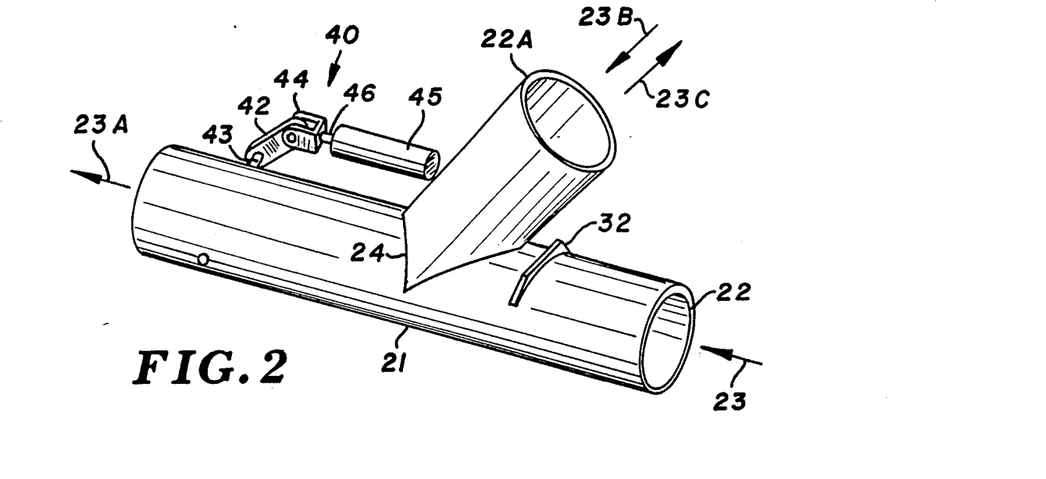
FIG. 2 is a detail perspective view of the external portions of the hollow delivery booms of the present invention, and illustrating the point at which the solid supply tube joins the delivery boom, and also the point at which the improved shutoff means of the present invention is positioned.
Figure 2A:
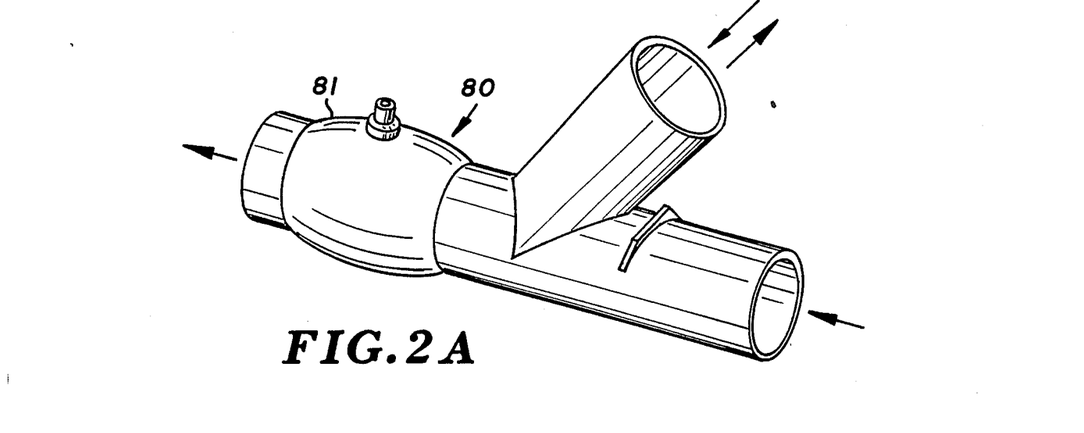
FIGS. 2A, 3A, and 4A are views similar to FIGS. 2, 3 and 4 respectively, and illustrating a modified form of valve for achieving boom shut-off.
Figure 3:
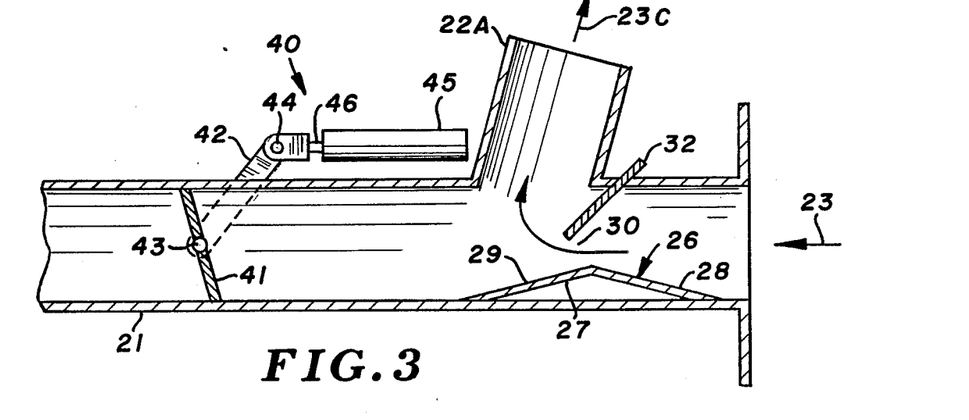
FIG. 3 is a view taken through the diameter of that portion of the device illustrated in FIG. 2 and illustrating the damper of the shut-off means while in its closed disposition for boom shut-off.
Figure 3A:
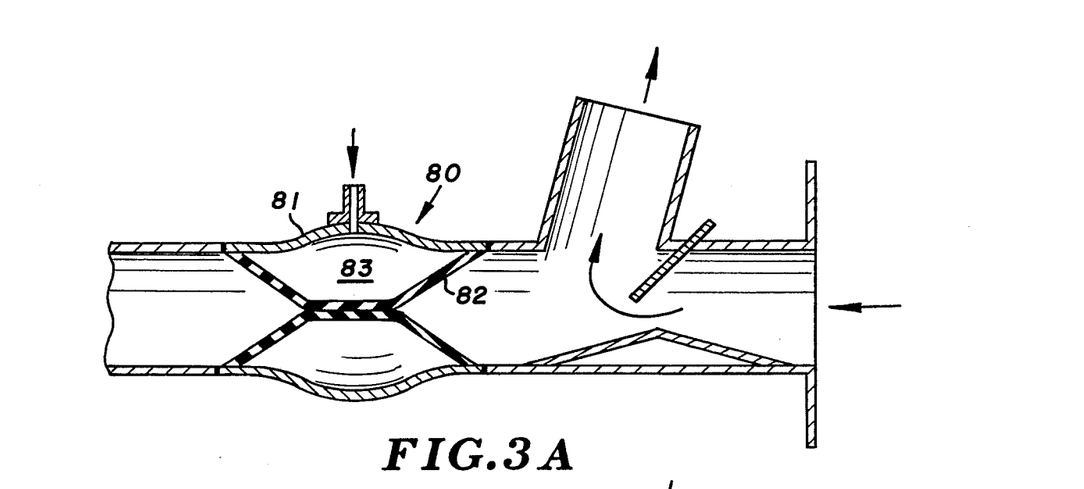
Figure 4:
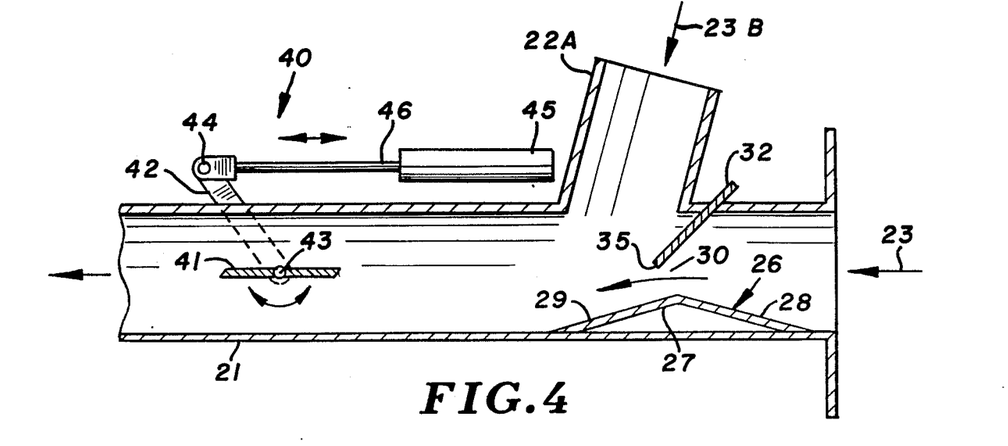
FIG. 4 is a view similar to FIG. 3, but illustrating the flow damper in its open disposition.
Figure 4A:
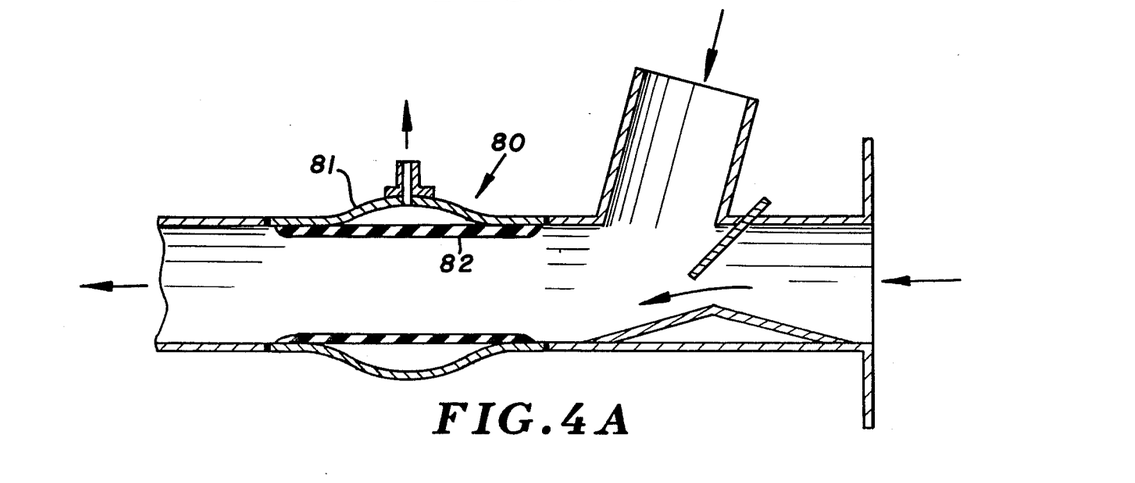

Attention is now directed to FIGS. 2-4 of the drawings wherein details of one embodiment of the boom shut-off arrangement provided within each of the hollow delivery booms is disclosed. Specifically, and with attention being directed to FIGS. 2-4 of the drawings, the boom shut-off containing portion generally designated 20 of the system 10, comprises a relatively short axial segment 21 of one of the delivery booms 15—15, with the end 22 being an end adjacent to or constituting the inner or proximal end of tube 21. A segment 22A of a tubular feed member 18 is also shown, with this segment having been previously referred to as a portion of one of the plurality of tubular feed members 18—18 which are in communication with the distribution head 13. Tube segment 22A is coupled with boom segment 21 at juncture point 24.

Venturi means are provided within the system as shown generally at 26. Venturi 26 includes a body portion 27 with an inlet ramp 28, an outlet ramp 29, and a generally rectangular throat portion 30 therebetween. Throat portion 30 extends radially inwardly from the inner surface of the boom and defines generally a chordal line across the hollow delivery boom, such as is seen in the views of FIGS. 3 and 4. The Venturi means 26 further functions in cooperation with blade means 32, with blade means 32 being mounted in generally opposed relationship to the throat portion of the Venturi means 26. The zone between the radially inwardly disposed tip of blade 32 and the throat portion 30 defines a gap therebetween, and thus controlling the cross-sectional area available for the flow of air through the throat zone 30 of the Venturi 26. The tip of the blade 32 extends generally along a chordal line of delivery boom segment 21, with the tip being shown at 35 (FIG. 4). Blade 32 is mounted at an angle which converges toward the distal end of the boom. Furthermore, the inner tip of blade 32, as at 35, intersects at least a portion of a projection of an inwardly directed projection of tubular feed member 22A into delivery boom segment 21. This disposition of blade 32 assists in controlling the constant width opening across the flow of air through the system and in creating the vacuum in tube 22A during periods of normal operation.

As indicated in the drawings, blade 32 is normally set in place, but can be made to be adjustably positioned in order to create the maximum vacuum in the tube 22A during times of normal operation. When the system is functioning with an individual boom in shut-off condition, then and in that event, the related tubular feed members 18—18 function as a flow conduit for recirculation of compressed air through tubular feed member 18 and into the distribution head for ultimate discharge through one or more of the booms which remain operational in the normal mode. Blade 32 further aids in effecting positive flow directions for the solids at all times, and the configuration of the opening eliminates or substantially reduces any build up or clogging of particulate solids within the delivery tubes, regardless of the immediate mode of operation.

With continued attention being directed to FIGS. 2, 3 and 4 of the drawings, it will be observed that arrow 23 represents the direction of flow of air through the proximal end of the boom, with arrow 23A illustrating the normal and continuing flow of air during period of normal operation. Air from the distribution head, along with the aliquot portion of solids flows through each of the tubes 18—18 in the direction of arrow 23B. During times of boom shut-off with damper 41 closed, air passing from the plenum and into the boom along the direction of arrow 23 is diverted, and flows back to the distribution head along one of the tubular feed members 18—18 and in the direction of the arrow 23C. Any particulate material which may have been confined within the boom at a point in time when shut-off was initiated will accordingly be entrained or suspended within the flow of air in the direction of arrow 23C and either become suspended in the air column or ultimately returned to the distribution head without contributing to an accumulation or clogging of material within the relevant boom member.

Figure 1C:
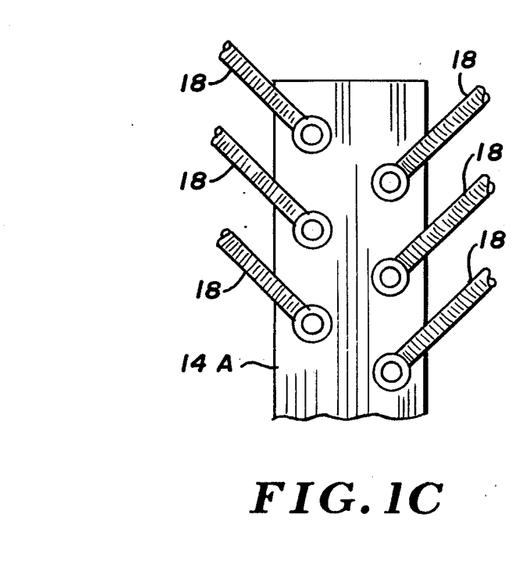
FIG. 1C is a detail side elevational view, partially broken away and on a slightly enlarged scale, of the upper portion of the plenum or manifold utilized to distribute and deliver pressurized air from a source into the individual booms, and with the lower portion of the plenum being broken away.

Attention is now directed to FIG. 1C of the drawings wherein the arrangement of the individual outlets is shown. This arrangement provides a system wherein the individual tubular feed members 18—18 can be disposed in an arrangement where individual coupling elements are less likely to interfere, one with the other. Additionally, it is believed that a more uniform flow of air through the system results from the arrangement as illustrated in FIG. 1C.

Specifically, the coupling between the proximal ends 16—16 of the booms and the face of the plenum are arranged in staggered positions at the juncture points with the plenum body. Thus, and as illustrated in somewhat exaggerated form in FIG. 1C, the individual tubular feed members 18—18 may be arranged in neater and less concentrated positions.

In certain instances, it may be desirable to utilize a baffle and/or scoop in the plenum area so as to tend to equalize the flow of air through the individual booms. When utilized, such scoops and/or baffles are usually positioned and utilized on those booms which are disposed most closely adjacent the inlet of the pressurized air from the blower or other source.

Turning now to the shut-off feature of the present invention, and with particular attention being directed to FIGS. 2–4 inclusive of the drawings, boom shut-off system generally designated 40 comprises a flow-blocking damper 41 disposed in each boom for which shut-off may be desired, with the position of damper 41 being controlled by actuating or articulating linkage 42. Linkage 42 includes, as indicated, actuating rod 43 together with pivotal linkage means 44. The position of the individual dampers 41 is determined by associated hydraulic cylinder 45 and its ram 46. Alternatively, solenoids may be utilized to actuate the damper linkage members. The immediate position of ram 46, such as either extended position or retracted position, will, of course, determine the open or closed position of the associated damper plate 41.

As indicated hereinabove, the percentage or portion of the cross-sectional area of the boom which is closed or blocked by blocking damper 41 is preferably greater than about 75 percent and up to 100 percent of the total cross-sectional area. It has been found that essentially total interruption of flow will be achieved when at least about 75 percent of the area is closed, and it has been further found that the boom structures remain free of accumulation of the granular or particulate material being distributed when at least about 25 percent of the cross-sectional area is permitted to remain open.

The system of the present invention is particularly adapted for use with spreader systems wherein it is desired that one or more of the delivery booms be deactivated or shut-off during times when the remaining booms are in normal operation. Such periods of deactivation would typically occur when the spreader is making its final pass across a field, and while the end portion of a field is being treated with the area remaining to be treated having a width less than the full width of the spreader. Because excessive or double-application of materials can be extremely detrimental, particularly when utilizing a combination of fertilizers and/or herbicides, it becomes necessary to provide a means for avoiding such double-application, while maintaining the application at its preselected rate. Thus, the system of the present invention is useful with those systems having a plurality of hollow delivery booms of differing lengths and wherein it becomes desirable for deactivating or shutting-off preselected booms so as to preserve uniform rates of application. In certain instances and for purposes of uniformity, it has been found desirable to increase the diameter of the longer booms utilized in multiple boom systems in order to reduce the amount of back pressure created in these longer booms. Also, the outward portions of the longer booms may be coupled with an expanded zone so as to have at least a portion of the delivery boom provided with a somewhat increased diameter relative to the shorter booms. Such a design also provides a means of reducing back pressure within longer booms, along with maximum vacuum being maintained in tube 22A coupled to the distributor head.

As indicated hereinabove, whenever the system is operating in a partial shut-off mode, the quantity of granular or particulate material being introduced into the system must be reduced in order to compensate for the reduction in overall delivery. With attention being directed to FIG. 1B of the drawings, it will be noted that the auger shown generally at 50 includes an outer sleeve 51, together with an internally arranged screw 52. Screw 52 is driven by a constant speed motor 53 with the conveyor bringing material from hopper 12 to the auger screw 52 being driven by variable speed motor 53A, the speed of which is controlled by motor speed control 54 (see FIGS. 5 and 6). Thus, whenever one or more booms are shut off, steps are taken to proportionally reduce the speed of conveyor system including motor 53A supplying auger screw 52 in order to maintain a constant material application rate. A speed proportioning means is adequate to provide for control of the conveyor speed of horizontal conveyor drive motor 53A. Variable speed motors are utilized in connection with conveyor motor 53A, with a conventional speed control being also appropriate for utilization in speed control 54. Such drive motors and speed controls are, of course, commercially available.

Figure 5:
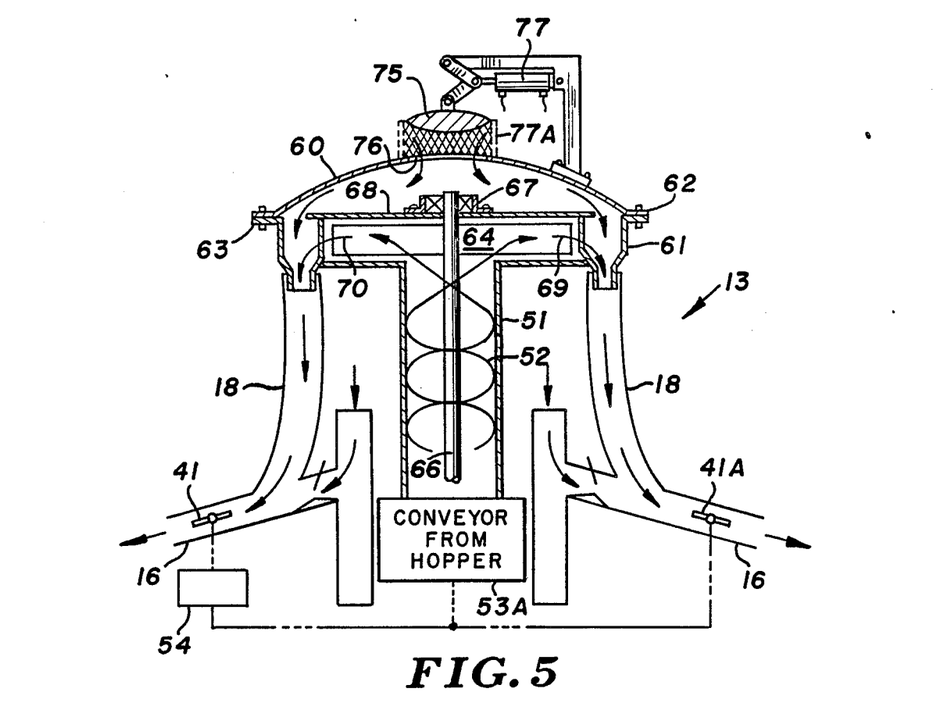
FIG. 5 is a vertical sectional view of a typical distribution head, in combination with a plurality of booms, and with all of the booms being in open or normal operational mode, and with the vent to the head being open.
Figure 6:
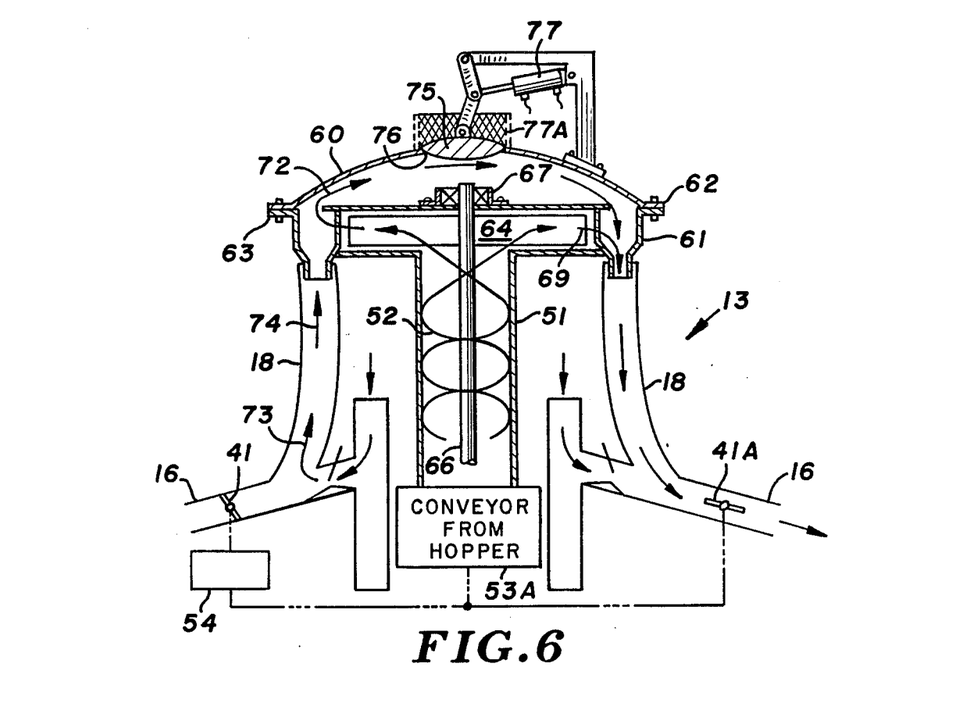
FIG. 6 is a view similar to FIG. 5, but illustrating the system with one of the booms being in shut-off mode, and with the air vent to the head being closed.
Figure 7:
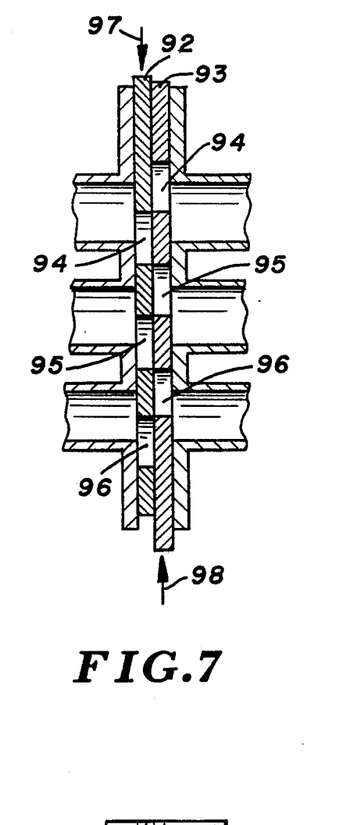
FIG. 7 is a vertical sectional view of a segment of the boom located downstream from the point where the distribution head feed lines intersect the booms, and illustrating a modified form of shut-off valve in the form of a shuttle valve and showing the shuttle valves in closed disposition.
Figure 8:
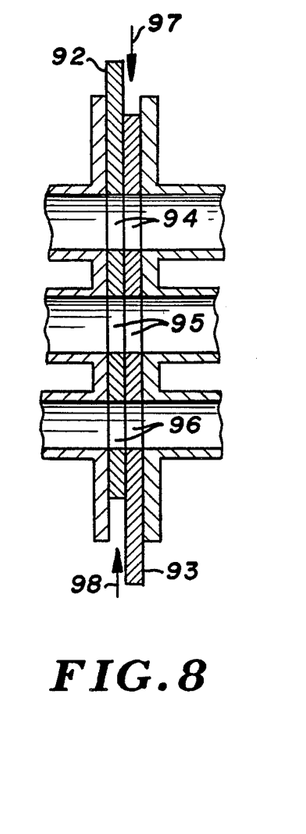
FIG. 8 is a view similar to FIG. 7, and illustrating the shuttle valve arrangement in open disposition.
Figure 9:
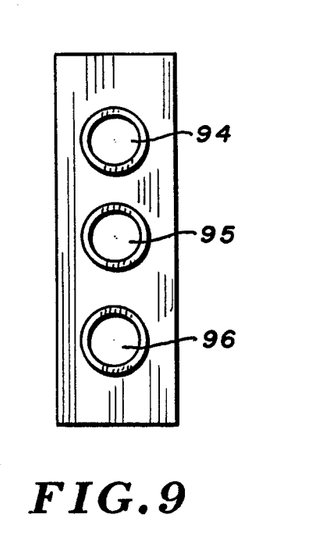
FIG. 9 is a view taken axially of that portion of the booms shown in FIGS. 7 and 8, and illustrating the shuttle valves in open disposition.

Attention is now directed to FIGS. 5 and 6 of the drawings wherein the interior of the distribution head is illustrated. Specifically, and in FIG. 5, distribution head 13 includes a cover member 60 overlying flanged outer scalloped member 61, with cover 60 joining member 61 at and along mating surfaces 62 and 63 respectively. An internally arranged spinner 64 is provided which rotates with auger screw 52 disposed within auger housing or sleeve 51. Shaft 66 extends upwardly from auger screw 52, and is maintained within a bearing housing such as at 67. In the arrangement illustrated, bearing housing 67 is shown mounted upon the top surface of plate member 68, although in certain applications, it may be desirable for bearing 67 to be disposed on the underside of plate 68. Spinner 64 is preferably provided with arcuately formed arms, which are mounted at their inner ends on shaft 66. Spinner 64 moves solid material, such as granular material, outwardly along the path of arrows 69 and 70. As indicated, the granular material, such as fertilizer or the like, moves along a path from the lifting auger 51–52, outwardly through spinner elements 64, and thence into tubular feed members 18—18. As is indicated in FIG. 5, both dampers 41 and 41A are in open or normal position, thus permitting flow to occur through the associated booms.

Attention is now directed to FIG. 6 of the drawings wherein damper 41 is closed, while damper 41A remains open. In this arrangement, the flow of air and granular material is modified from the arrangement of FIG. 5. Specifically, the granular material continues to move along path 69, but assumes a modified path of travel as along the path of arrow 72. Air from the manifold moves along path of arrow 73, and upwardly through tubular feed member 18 along the path of arrow 74. This added flow of air requires attention be given to the air inlet or communication with atmosphere.

With continued attention being directed to both FIGS. 5 and 6, it will be noted that vent valve 75 of lenticular configuration is provided within top 60. Vent valve 75 is arranged to control the open and/or closed disposition of cap opening 76 which establishes communication between the interior of the distributor head and atmosphere. Actuating means, such as solenoid or hydraulically actuated means, are provided as shown at 77 for controlling the opening and/or closure of valve 75. Vent valve 75 seats appropriately upon the perimeter of opening 76 so as to controllably close the opening. Appropriate screen or grid members are provided as at 77A in order to prevent influx of undesired extraneous trash and/or other materials.

It has been found that air motion within the confines of the distributor head contributes to the flow of granular material into and through the active or open booms. Accordingly, the utilization of a vent valve having a configuration in which a portion of the valve body enters the distribution head may assist in equalizing air motion within the head. Also, the positioning of bearing housing 67 can be utilized to equalize and/or otherwise control the flow of air, motion of air, and/or air currents within the distribution head so as to equalize distribution of material into and through the open booms.

With attention now being directed to FIG. 6, it will be noted that vent valve 75 is in closed disposition on its seat formed about cap opening 76, thereby closing any communication between interior of the distributor head and atmosphere. Because of the additional flow of air from the fan source through the plenum or manifold, an adequate flow of air is provided for the entire system, and particularly for the system serving the open, operational, and functional booms.

DESCRIPTION OF ALTERNATE PREFERRED EMBODIMENT

Attention is now directed to FIGS. 2A, 3A and 4A of the drawings wherein a modified form of flow control valve is illustrated, particularly the shut-off valve for use in individual booms. The valve generally designated 80 may be characterized as a pinch valve, with the valve including a body portion 81 with a bladder 82 formed therewithin. Bladder 82 forms a continuum with the individual boom, and is arranged to respond to pressure applied externally thereof to interrupt or shut-off flow therealong. Outer chamber 83 is pressurized with an appropriate pressurized fluid, and thereby driving or pinching the surfaces of bladder 82 into contact, one with the other, thereby achieving shut-off. Valves of the type illustrated in FIGS. 2A, 3A and 4A are commercially available, with one such valve being marketed by Red Valve Company of Carnegie, Pa. under the trade designation "TYPE A".

DESCRIPTION OF SECOND ALTERNATE PREFERRED EMBODIMENT

Attention is now directed to FIGS. 7, 8 and 9 wherein a still further shut-off valve embodiment is illustrated. In this arrangement, a system of shuttle or sliding plates with openings formed therealong is provided, with the shuttle valve arrangement of FIG. 7 being mounted along the booms, preferably within or adjacent the hinge point 91 of the booms 15—15 of FIG. 1A. Specifically, booms 15—15 are intercepted with vertically sliding shuttle plate members 92 and 93, with each of the shuttle plate members 92 and 93 having a plurality of bores 94, 95, and 96 formed therein. By appropriate positioning of shuttle plates 92 and 93, the openings between continuous segments of booms 15—15 may be interrupted, thus causing a recirculation of pressurized air in the manner discussed in the embodiment of FIGS. 2–4 hereinabove. Shuttle plates 92 and 93 are moved upwardly and/or downwardly in response to reciprocal sliding motion of linkage arms moving in the direction of arrows 97 and 98, so as to properly position the respective openings therewithin. As indicated above, when in open position, bores 94, 95 and 96 of shuttle plates 92 and 93 provide open communication along boom 15, however when shifted in their vertical position so as to each partially block such flow, the associated booms are shut off. In the event the staggered relationship of booms 15—15 is such that the inter-boom spacing is less than one boom diameter, then the utilization of a pair of plates such as shuttle plates 92 and 93 will permit substantially complete opening and/or closure of individual booms therealong. The arrangement illustrated in FIG. 7 is particularly adapted for operation with one lateral set of booms being shut off, and with the other lateral set of booms remaining in open and operational disposition.

DESCRIPTION OF THIRD ALTERNATE PREFERRED EMBODIMENT

As an additional modification, the system of sliding plates may be replaced with a blocking plate which may be introduced into the boom system at the hinge plate or boom folding point. In this arrangement, a blocking plate may be introduced either manually or automatically, with the blocking plate being interposed between separate hinged sections of an otherwise continuous boom. This blocking plate functions to close off the individual booms, as desired.

It will be further appreciated that the details of the design illustrated here are for purposes of illustration only, and are not to be construed as a limitation upon the scope of the present invention.

What is claimed is:

1. In combination with a pressurized pneumatic system for substantially uniform distribution of particulate solids upon the soil from a system mounted upon a self-propelled vehicle and including a reservoir with a source of supply of particulate solids to be distributed, a distribution head means for metering and apportioning particulate solids from said source into a plurality of generally aliquot portions, a plurality of elongated hollow delivery tubes of predetermined and differing lengths extending laterally outwardly of said vehicle from a proximal end to a distal discharge end, a source of compressed air for creating a flow of pressurized air through said hollow elongated delivery tubes, a plurality of tubular feed members, each extending between said distribution head and a selected one of said delivery tubes, for creating a fluid communication link between each of said tubes and said distribution head to accommodate delivery of each of said aliquot portions from the proximal end to the distal discharge end of a boom when operative, a juncture point adjacent the proximal end of each of said hollow elongated delivery tubes for introducing one aliquot portion of particulate solids to the flow of pressurized air moving through each of said delivery tubes when operative, and means adjacent said juncture point for creating a partial vacuum along said delivery tube during times of passage of particulate solids therethrough; the improvement comprising:
  (a) shut-off means operatively coupled to at least a preselected one of said elongated delivery tubes and comprising:
    (1) damper means rotatably positioned within said preselected delivery tube and being disposed in spaced relationship and immediately downstream from said juncture point; and
    (2) drive means for advancing said damper from a normal open disposition wherein the damper is arranged substantially parallel to the axis of said preselected delivery tube to a closed disposition wherein said damper occupies and blocks the flow of air across at least about 75 percent of the inner cross-section of said preselected delivery tube.

2. The system as defined in claim 1 being particularly characterized in that said shut-off drive means is a hydraulic cylinder.

3. The system as defined in claim 1 being particularly characterized in that said distribution head is equipped with an auger for delivery of particulate solids from said reservoir to said distributor head at a point where aliquot portions are formed therefrom.

4. The system as defined in claim 1 being particularly characterized in that a shut-off means is provided along each of said delivery tubes downstream from said means for creating a partial vacuum therewithin.

5. In combination with a pressurized pneumatic system for substantially uniform distribution of particulate solids upon the soil from a system mounted upon a self-propelled vehicle and including a reservoir with a source of supply of particulate solids to be distributed, a distribution head means for metering and apportioning particulate solids from said source into a plurality of generally aliquot portions, a plurality of elongated hollow delivery tubes of predetermined and differing lengths extending laterally outwardly of said vehicle from a proximal end to a distal discharge end, a source of compressed air for creating a flow of pressurized air through said hollow elongated delivery tubes, a plurality of tubular feed members, each extending between said distribution head and a selected one of said delivery tubes, for creating a fluid communication link between each of said tubes and said distribution head to accommodate delivery of each of said aliquot portions from the proximal end to the distal discharge end of a boom when operative, a juncture point adjacent the proximal end of each of said hollow elongated delivery tubes for introducing one aliquot portion of particulate solids to the flow of pressurized air moving through each of said delivery tubes when operative, and means adjacent said juncture point for creating a partial vacuum along said delivery tube during times of passage of particulate solids therethrough; the improvement comprising:
  (a) shut-off means operatively coupled to at least a preselected one of said elongated delivery tubes and comprising:
    (1) damper means rotatably positioned within said preselected delivery tube and being disposed in spaced relationship and immediately downstream from said juncture point; and
    (2) drive means for advancing said damper from a normal open disposition wherein the damper is arranged substantially parallel to the axis of said preselected delivery tube to a closed disposition wherein said damper occupies and blocks the flow of air across at least about 75 percent of the inner cross-section of said preselected delivery tube; and
  (b) said distribution head being vented to atmosphere in the zone where said aliquot portions are being created.

6. In combination with a pressurized pneumatic system for substantially uniform distribution of particulate solids upon the soil from a system mounted upon a self-propelled vehicle and including a reservoir with a source of supply of particulate solids to be distributed, a distribution head means for metering and apportioning particulate solids from said source into a plurality of generally aliquot portions, a plurality of elongated hollow delivery tubes of predetermined and differing lengths extending laterally outwardly of said vehicle from a proximal end to a distal discharge end, a source of compressed air for creating a flow of pressurized air through said hollow elongated delivery tubes, a plurality of tubular feed members, each extending between said distribution head and a selected one of said delivery tubes, for creating a fluid communication link between each of said tubes and said distribution head to accommodate delivery of each of said aliquot portions from the proximal end to the distal discharge end of a boom when operative, a juncture point adjacent the proximal end of each of said hollow elongated delivery tubes for introducing one aliquot portion of particulate solids to the flow of pressurized air moving through each of said delivery tubes when operative, and means adjacent said juncture point for creating a partial vacuum along said delivery tube during times of passage of particulate solids therethrough; the improvement comprising:
  (a) shut-off means operatively coupled to at least a preselected one of said elongated delivery tubes and comprising:
    (1) damper means rotatably positioned within said preselected delivery tube and being disposed in spaced relationship and immediately downstream from said juncture point; and
    (2) drive means for advancing said damper from a normal open disposition wherein the damper is arranged substantially parallel to the axis of said preselected delivery tube to a closed disposition wherein said damper occupies and blocks the flow of air across at least about 75 percent of the inner cross-section of said preselected delivery tube; and
  (b) said distribution head being equipped with an auger for delivery of particulate solids from said reservoir to said distributor head at a point where aliquot portions are formed therefrom; and
  (c) conveyor means are provided for bringing material to said auger and wherein said conveyor means has variable speed motor drive means with motor control means being provided to vary the speed of said conveyor variable speed motor in response to closing of said preselected boom by said shut-off means.

7. In combination with a pressurized pneumatic system for substantially uniform distribution of particulate solids upon the soil from a system mounted upon a self-propelled vehicle and including a reservoir with a source of supply of particulate solids to be distributed, a distribution head means for metering and apportioning particulate solids from said source into a plurality of generally aliquot portions, a plurality of elongated hollow delivery tubes of predetermined and differing lengths extending laterally outwardly of said vehicle from a proximal end to a distal discharge end, a source of compressed air for creating a flow of pressurized air through said hollow elongated delivery tubes, a plurality of tubular feed members, each extending between said distribution head and a selected one of said delivery tubes, for creating a fluid communication link between each of said tubes and said distribution head to accommodate delivery of each of said aliquot portions from the proximal end to the distal discharge end of a boom when operative, a juncture point adjacent the proximal end of each of said hollow elongated delivery tubes for introducing one aliquot portion of particulate solids to the flow of pressurized air moving through each of said delivery tubes when operative, and means adjacent said juncture point for creating a partial vacuum along said delivery tube during times of passage of particulate solids therethrough; the improvement comprising:

(a) shut-off means operatively coupled to each of said elongated delivery tubes and comprising:
(1) damper means rotatably positioned within each of said delivery tubes and being disposed in spaced relationship and immediately downstream from said juncture point; and
(2) drive means coupled to each of said delivery tubes for advancing preselected ones of said dampers from a normal open disposition wherein the damper is arranged substantially parallel to the axis of its delivery tube to a closed disposition wherein said damper occupies and blocks the flow of air across at least about 75 percent of the inner cross-section of said delivery tube.

8. The system as defined in claim 7 being particularly characterized in that each of said shut-off drive means is a hydraulic cylinder.

9. The system as defined in claim 7 being particularly characterized in that said distribution head is vented to atmosphere in the zone where said aliquot portions are being created.

10. The system as defined in claim 7 being particularly characterized in that said distribution head is equipped with an auger for delivery of particulate solids from said reservoir to said distributor head at a point where aliquot portions are formed therefrom and wherein conveyor means are provided for bringing material to said auger with variable speed motor drive means being provided to vary the speed of said variable speed conveyor motor in response to closing of one or more of said booms by said shut-off means.

11. In combination with a pressurized pneumatic system for substantially uniform distribution of particulate solids upon the soil from a system mounted upon a self-propelled vehicle and including a reservoir with a source of supply of particulate solids to be distributed, a distribution head means for metering and apportioning particulate solids from said source into a plurality of generally aliquot portions, a plurality of elongated hollow delivery tubes of predetermined and differing lengths extending laterally outwardly of said vehicle from a proximal end to a distal discharge end, a source of compressed air for creating a flow of pressurized air through said hollow elongated delivery tubes, a plurality of tubular feed members, each extending between said distribution head and a selected one of said delivery tubes, for creating a fluid communication link between each of said tubes and said distribution head to accommodate delivery of each of said aliquot portions from the proximal end to the distal discharge end of a boom when operative, a juncture point adjacent the proximal end of each of said hollow elongated delivery tubes for introducing one aliquot portion of particulate solids to the flow of pressurized air moving through each of said delivery tubes when operative, and means adjacent said juncture point for creating a partial vacuum along said delivery tube during times of passage of particulate solids therethrough; the improvement comprising:

(a) shut-off means operatively coupled to each of said elongated delivery tubes and comprising:
(1) delivery tube blocking means positioned within each of said delivery tubes and being disposed in spaced relationship and immediately downstream from said juncture point; and
(2) drive means coupled to each of said delivery tube blocking means for advancing preselected ones of said damper blocking means from an open disposition to a closed disposition wherein said delivery tube blocking means occupies and blocks the flow of air across at least about 75 percent of the inner cross-section of said delivery tube.

12. The system as defined in claim 11 being particularly characterized in that said distribution head is vented to atmosphere in the zone where said aliquot portions are being created.

13. The system as defined in claim 11 being particularly characterized in that said distribution head is equipped with an auger for delivery of particulate solids from said reservoir to said distributor head at a point where aliquot portions are formed therefrom and wherein conveyor means are provided for bringing material to said auger with variable speed motor drive means being provided to vary the speed of said variable speed conveyor motor in response to closing of one or more of said booms by said shut-off means.

* * * * *